United States Patent [19]
Adams et al.

[11] Patent Number: 5,819,036
[45] Date of Patent: Oct. 6, 1998

[54] METHOD FOR MESSAGE ADDRESSING IN A FULL SERVICE NETWORK

[75] Inventors: Michael B. Adams, Castle Rock; Louis D. Williamson, Broomfield, both of Colo.

[73] Assignee: Time Warner Cable, Stamford, Conn.

[21] Appl. No.: 572,521

[22] Filed: Dec. 14, 1995

[51] Int. Cl.[6] ...................................................... H03F 3/24
[52] U.S. Cl. ........................................ 395/200.33; 348/6
[58] Field of Search .......................... 395/200.9, 200.15, 395/200.16, 114, 200.33; 364/514 R; 348/6; 370/397, 409, 420, 355

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,823,386 | 4/1989 | Dumbauld et al. . |
| 4,991,208 | 2/1991 | Walker et al. . |
| 5,046,090 | 9/1991 | Walker et al. . |
| 5,093,718 | 3/1992 | Hoarty et al. . |
| 5,168,353 | 12/1992 | Walker et al. . |
| 5,220,420 | 6/1993 | Hoarty et al. . |
| 5,225,267 | 7/1993 | Hansen et al. . |
| 5,311,423 | 5/1994 | Clark . |
| 5,343,239 | 8/1994 | Lappington et al. . |
| 5,357,276 | 10/1994 | Banker et al. . |
| 5,361,091 | 11/1994 | Hoarty et al. . |
| 5,383,112 | 1/1995 | Clark . |

(List continued on next page.)

OTHER PUBLICATIONS

Adams, Michael, "Network Design and Implementation of a large–scale, ATM, Multimedia Network," *Engineer Conference Notes* from NETWORLDsm+INTEROP® 95, Las Vegas, NV (Mar. 27–31, 1995).

Adams, Michael, "Real Time MPEG Asset Delivery over ATM," *NCTA Technical Papers, 1995*:315–326 (1995).

News Release, "Time Warner Introduces World's First Full Service Network in Orlando," TimeWarner Cable Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11,1993), Time Warner Cable, Denver, CO.

Vecchi, Mario P., and Adams, Michael, "Traffic Management for Highly Interactive Transactional System," *NCTA Technical Papers*, 1995:258–266 (1995).

*Primary Examiner*—James P. Trammell
*Assistant Examiner*—Thomas Peeso
*Attorney, Agent, or Firm*—Homer L. Knearl; Holland & Hart llp

[57] ABSTRACT

The present invention is a novel method for addressing processing units in a network where some of the processing units are connected to a shared communications medium. In an embodiment of the present invention, the network comprises a head end, a plurality of modulators connected and addressable by the head end, and a plurality of set-top processors. The set-top processors are partitioned into subsets where each subset is assigned to a modulator. The modulator takes information streams from the head end and multicasts the streams to its assigned subset. In one embodiment, the information streams comprise packets that have address fields for facilitating delivery from the head end to a receiving set-top processor. One address field enables the routing of the packet from the head end to the modulator assigned to the receiving set-top processor. Once the modulator receives and multicasts the packet onto its shared communications medium, each set-top processor in the assigned subset receives the packet and recognizes whether or not the packet is addressed to itself.

8 Claims, 11 Drawing Sheets

U.S. PATENT DOCUMENTS

| | | |
|---|---|---|
| 5,390,337 | 2/1995 | Jelinek et al. . |
| 5,394,394 | 2/1995 | Crowther et al. . |
| 5,400,401 | 3/1995 | Wasilewski et al. .......... 380/9 |
| 5,400,402 | 3/1995 | Garfinkle . |
| 5,412,720 | 5/1995 | Hoarty . |
| 5,421,031 | 5/1995 | De Bey . |
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |
| 5,544,161 | 8/1996 | Bigham et al. .......... 370/58.1 |

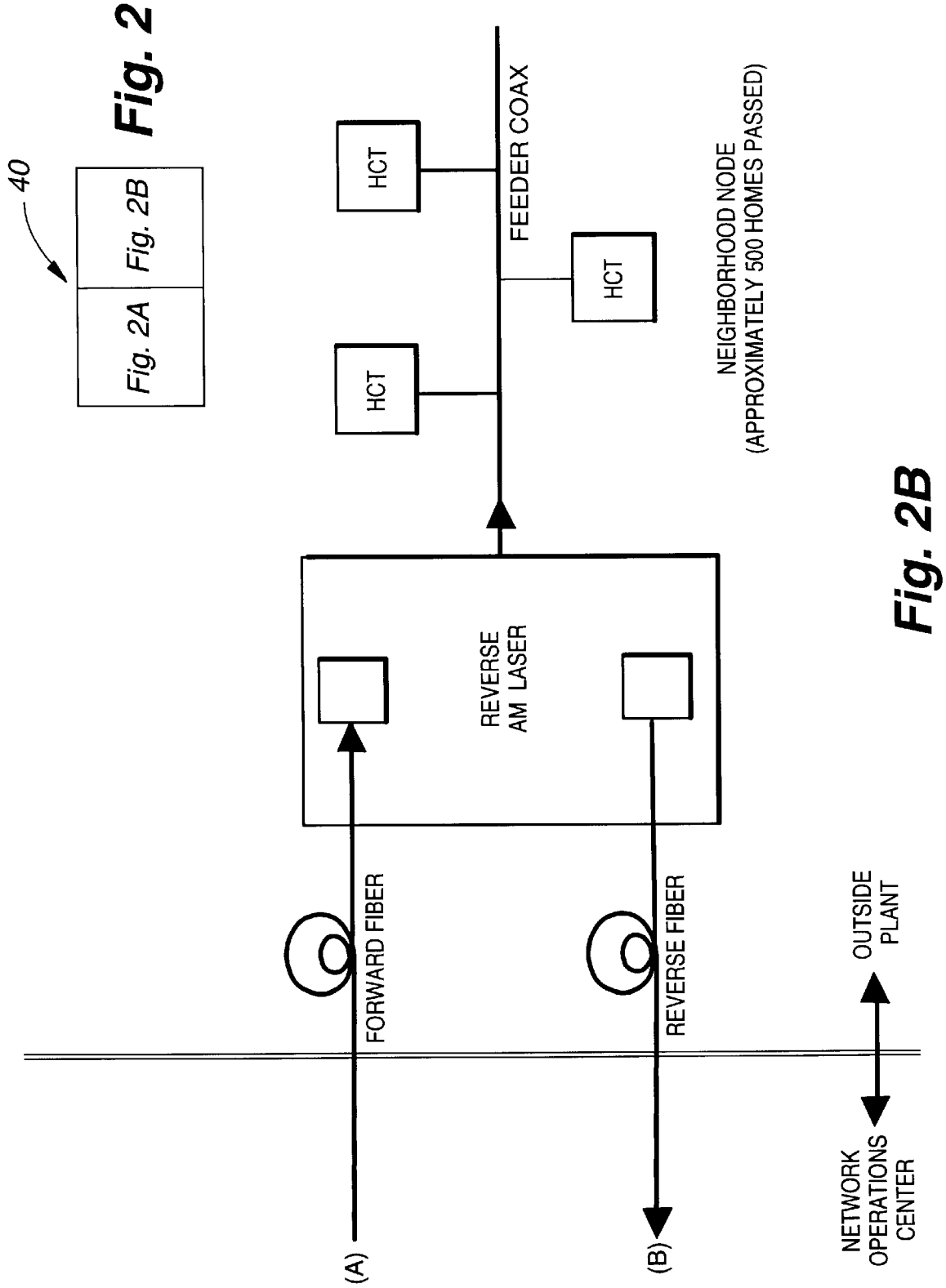

METHOD FOR MESSAGE ADDRESSING IN A FULL SERVICE NETWORK

FIELD OF THE INVENTION

The present invention relates in general to a method for addressing messages in a network and, in particular, to a method for addressing messages in a full service network having a shared communications medium.

BACKGROUND OF THE INVENTION

"Full service" networks have been developed to provide advanced, interactive services to their subscribers. Advanced services such as "video-on-demand" (VOD) require that data streams of video, audio, graphics, instructions and the like are retrieved from a "head end" server to requesting subscribers on a time-critical basis. Head end servers typically update and manage stores of data and applications, process requests for services from subscribers, supply needed information streams to service these requests, and process data for subscribers' accounts (e.g. billing information).

Typically, a subscriber makes a service request via a "set-top processor" that is connected to the subscriber's television set. The set-top processor communicates this request to the head end server through a communications medium, such as an optical fiber cable, wireless medium, conventional coaxial cable and the like (or any combination thereof). Once received at the head end, the head end evaluates the request and checks to see if there is available resources to satisfy the request. A request might be denied if there is insufficient bandwidth to provide the requested service. Bandwidth availability varies greatly over time—as the number of subscribers currently receiving service increases, the likelihood that the remaining bandwidth is insufficient for subsequent requests also increases.

Since the most compelling applications for full service networks involve interactive video, time-critical delivery of video, audio, and graphics data is all important. As a result, many full service networks have chosen ATM, MPEG, or other such standards to deliver the requested services. Such networks are designed, however, on the premise that every processing unit connected to the network is directly addressable. Such "point-to-point" networks are, however, generally expensive to build. In response, network designers have made attempts to lower the cost of providing service for their subscribers.

One such attempt is to use the existing analog cable system in a subscriber area and upgrade it to a "full service" network. Conventional cable systems broadcast (or multicast) their services to their subscribers. These broadcasts take place over a shared communications medium, such as coaxial cable or wireless. This use of a shared communications medium, however, creates a design mismatch with "point-to-point" networking standards, such as ATM. Other means must be devised to provide the time-critical delivery of packets containing video, audio and graphics for seamless presentation to the subscriber. Thus, there is a need to enable the delivery of time-critical data streams to subscribers over systems that have a shared communication medium, at least for part of their total communications path.

It is thus an object of the present invention to provide a method for addressing processing units in a network where some of the processing units are connected to a shared communications medium.

SUMMARY OF THE INVENTION

Other features and advantages of the present invention will be apparent from the following description of the preferred embodiments, and from the claims.

The present invention is a novel method for addressing processing units in a network where some of the processing units are connected to a shared communications medium. In an embodiment of the present invention, the network comprises a head end, a plurality of modulators connected and addressable by the head end, and a plurality of set-top processors. The set-top processors are partitioned into subsets where each subset is assigned to a modulator. The modulator takes information streams from the head end and multicasts the streams to its assigned subset.

In one embodiment, the information streams comprise packets that have address fields for facilitating delivery from the head end to a receiving set-top processor. One address field enables the routing of the packet from the head end to the modulator assigned to the receiving set-top processor. Once the modulator receives and multicasts the packet onto its shared communications medium, each set-top processor in the assigned subset receives the packet and recognizes whether or not the packet is addressed to itself.

To recognize whether the packet is addressed to a given set-top processor, another field of the packet may contain an identifier or designator. In one embodiment, this identifier denotes a particular service session between a head end server and the receiving set-top processor. For example, a virtual channel number, agreed upon by the server and the receiving set-top processor for a given session, could identify the processor in a particular neighborhood subset.

One advantage of the present invention is cost. The addressing mechanism of the present invention allows designers to take advantage of existing networks having a shared communications medium, while providing time-critical packet delivery, such as provided by current point-to-point network standards.

For a full understanding of the present invention, reference should now be made to the following detailed description of the preferred embodiments of the invention and to the accompanying drawings.

DETAILED DESCRIPTION OF THE INVENTION

1. Physical Network Overview

Figure 1:
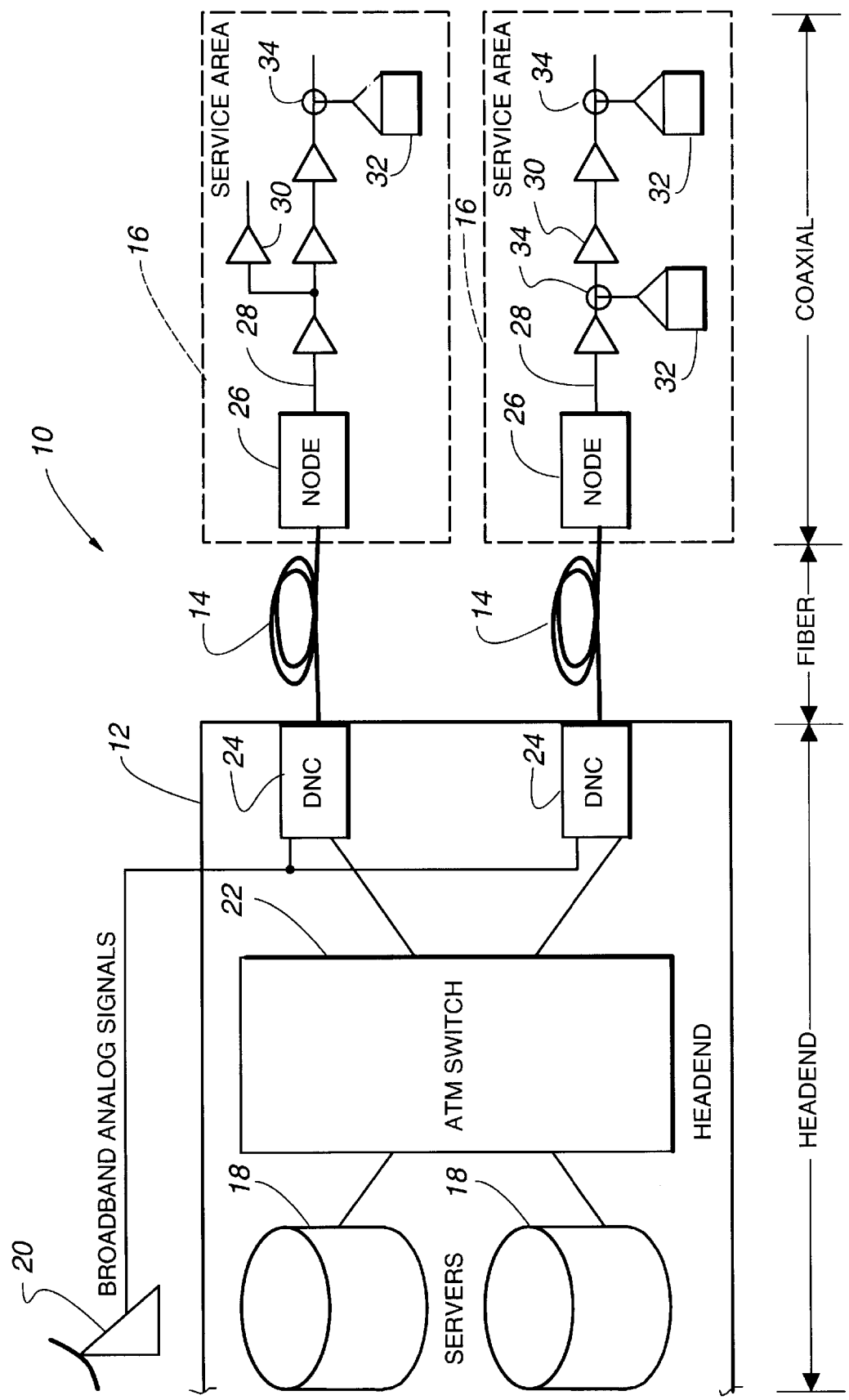
FIG. 1 is a high-level, block diagram of a full-service, interactive network that suffices for the purposes of the present invention.

FIG. 1 is a high level block diagram of a full-service network that suffices for the purposes of the present invention. Network 10 depicts a hybrid fiber/coaxial (HFC) network that attempts to combine existing neighborhood coaxial networks 16 with an optical fiber head end to provide interactive services. Broadly, network 10 can be visualized as comprising three main parts: (1) a head end 12, (2) an optical fiber cable 14 for providing a high speed, reliable communications link to, (3) the various neighborhood service areas 16.

Head end 12 further comprises a set of servers 18 that receive service requests from subscribers and supplies both digital data and programming to the subscribers in response. The digital signals from servers 18 are routed through ATM switch 22 to the appropriate digital node controller 24 which services the neighborhood for the requesting subscriber. Analog broadcast signals 20 from existing community access television (CATV) may also be received by head end 12. These analog broadcast signals are modulated, together with the digital signals from servers 18, by digital node controllers 24 and transmitted to the neighborhood service areas 16.

As can be seen in FIG. 1, the neighborhood service areas 16 comprise a node 26 which converts the optical signal from fiber cable 14 into electrical signals that can be carried via coaxial cable 28. This coaxial cable represents a shared communications medium for multiple subscribers 32 that are connected in a given neighborhood. At certain intervals along the coaxial cable, the signal is boosted by amplifiers 30 to counteract the effects of signal attenuation. Subscribers 32 connect to this shared communications medium via drop-off points 34.

Figure 2A:
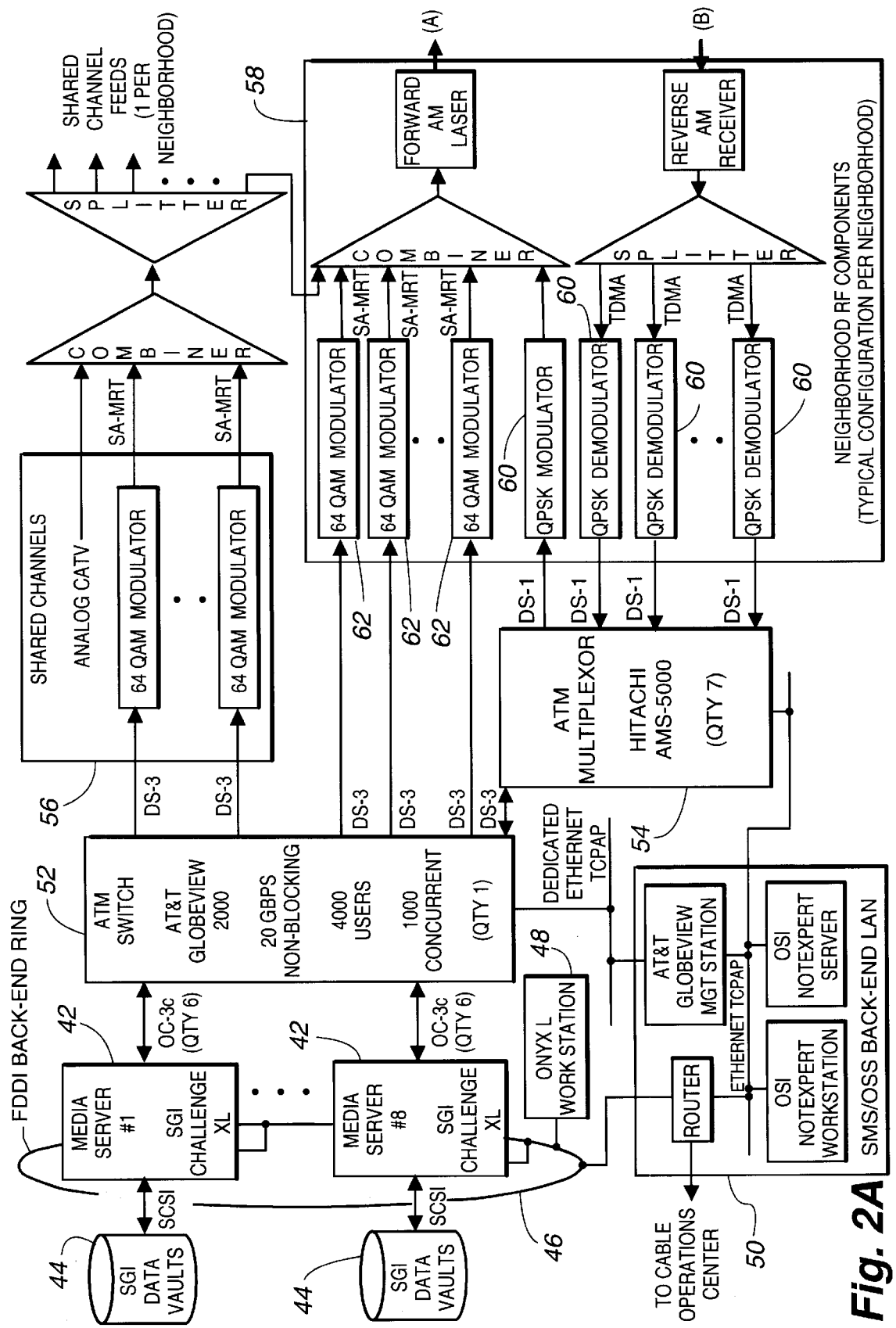
FIG. 2 is another, more detailed, embodiment of a full-service network (FSN) such as depicted in FIG. 1.

FIG. 2 is a more detailed embodiment of the network broadly depicted in FIG. 1. In fact, full-service network 40 is a high level diagram of the Time Warner Full Service Network (FSN) currently operating in Orlando, Fla. The FSN is designed to introduce a variety of new digital and interactive services to cable subscribers. These services require a network capable of delivering multiple media streams with full-duplex communications. Ideally, programming content is stored and retrieved "on demand" and subscribers should have the ability of control this content with VCR-like functionality (i.e. stop, pause, rewind and fast forward). These technical and operational objectives are met by use of client/server technologies. Thus, servers systems such as Silicon Graphics Inc. (SGI) Challenger XL servers 42, Challenger XI, disk vaults 44 are used as the primary server resources in the FSN. These servers are connected in a FDDI back-end ring which is managed by an Onyx L workstation 48 and a back-end LAN 50.

Servers 42 are responsible for running the applications which control the server portion of the FSN client/server dialogue. Servers 42 perform a "library storage" function, acting as the warehouse of all digitized media to be delivered over the network. Each server contains six OC-3 (155 Mbps) interface cards which connect to the ATM Globeview 2000 switch 52. Servers 42 retrieve the proper data from vaults 44 and forward it through the switch 52 to the proper neighborhood to which the receiving set-top processor is connected. Additionally, servers facilitate session management and transactional management services via communication with the FDDI back-end LAN 50.

ATM is a high bandwidth, low delay switching and multiplexing packet technology which operates on fixed-length 53 byte cells. ATM switch 52 is connected to servers 42, ATM multiplexor 54, and various RF subsystems, such as shared channel subsystem and neighborhood RF subsystem 58. Data, whether in the forward direction (e.g. movie delivery out to a subscriber) or in the reverse direction (e.g. order confirmation initiated by the customer), passes through the ATM switch 52.

The FSN architecture includes a number of DS1 circuits, which must be interfaced to the ATM switch 52 and be processed by the servers. In the interest of efficient bandwidth utilization, neither the switch 52 or the servers 42 are configured to accept this relatively low DS1 data rate. These technical issues are resolved through the implementation of ATM multiplexing within the FSN architecture. The ATM multiplexor 54 chosen for the FSN is the Hitachi AMS-5000. The multiplexors 54 connect to the ATM switch 52 and the neighborhood RF subsystem 58 which include QPSK modulators/demodulators 60. Bi-directional DS3 circuits are used for communication between the multiplexor and switch, and the uni-directional DS1 circuits to and from the RF subsystem. Multiplexing takes place from the RF-side DS1s into the ATM switch DS3 facilities. Here the ATM multiplexor 54 is used to convert reverse channel DS1s into a DS3 format for ATM switch processing. Conversely, demultiplexing occurs from the switch out to the RF subsystem. The ATM multiplexor 54 also interprets unique neighborhood forward control channels from a combined ATM DS3 stream delivered by the switch 52.

As noted, digital FSN services are transmitted to the subscriber over a traditional analog cable delivery system. Therefore, the radio frequency (RF) subsystem converts, in the forward direction, the digital signal stream from the switch and muxes to analog for transmission to the neighborhood nodes. In the reverse direction, the analog signal from the neighborhood nodes is converted to a digital signal stream and then transmitted to the muxes. In the forward direction, the DS3 digital signal stream is converted to analog with a 64-QAM modulators 62 and the DS1 stream is converted with QPSK modulators 60. In the reverse direction, the analog signal is converted to digital DS1 with a QPSK demodulator 60.

In addition to analog-to-digital conversion, the RF system serves to combine the analog signals from the QAM and QPSK modulators and the CATV head-end in the forward direction, and split the analog signals received from the nodes in the reverse direction.

The diversity of applications planned for the FSN subscribers requires the integration of several services, such as data, video, imaging and voice. As a result, the FSN is designed to transport a variety of bandwidth requirements which may exhibit either constant bit rate or "bursty" variable bit rate characteristics, as well as multiple protocols. Although asynchronous Transfer Mode (ATM) was chosen for the design of the FSN as shown in FIG. 2, it will be appreciated that other protocols known to those skilled in the art may have sufficed.

2. Addressing for The Full-Service Network.

Since ATM technology is relatively new, some standards are still being developed. Although switched virtual circuit (SVC) switching will enable software-based dynamic routing and call management, this functionality is still being standardized. As a result, SVC switching was not implemented in the FSN and the novel methods of the present invention were devised.

Within the ATM standard, multiplexing techniques allow more than one service to share a particular physical link (e.g. SONET or DS3) at any given time. Services are organized into virtual channels (VC) and virtual paths (VP). A virtual channel identifies a particular service, while a virtual path identifies a collections of virtual channels. ATM cells can be switched at both the VP and VC level. In the process of mapping services into an ATM cell stream, the switch packetizes virtual path identifiers (VPI) and virtual channel identifiers (VCI) information into each cell's header field to allow for reassembly of the received data.

Figure 3:
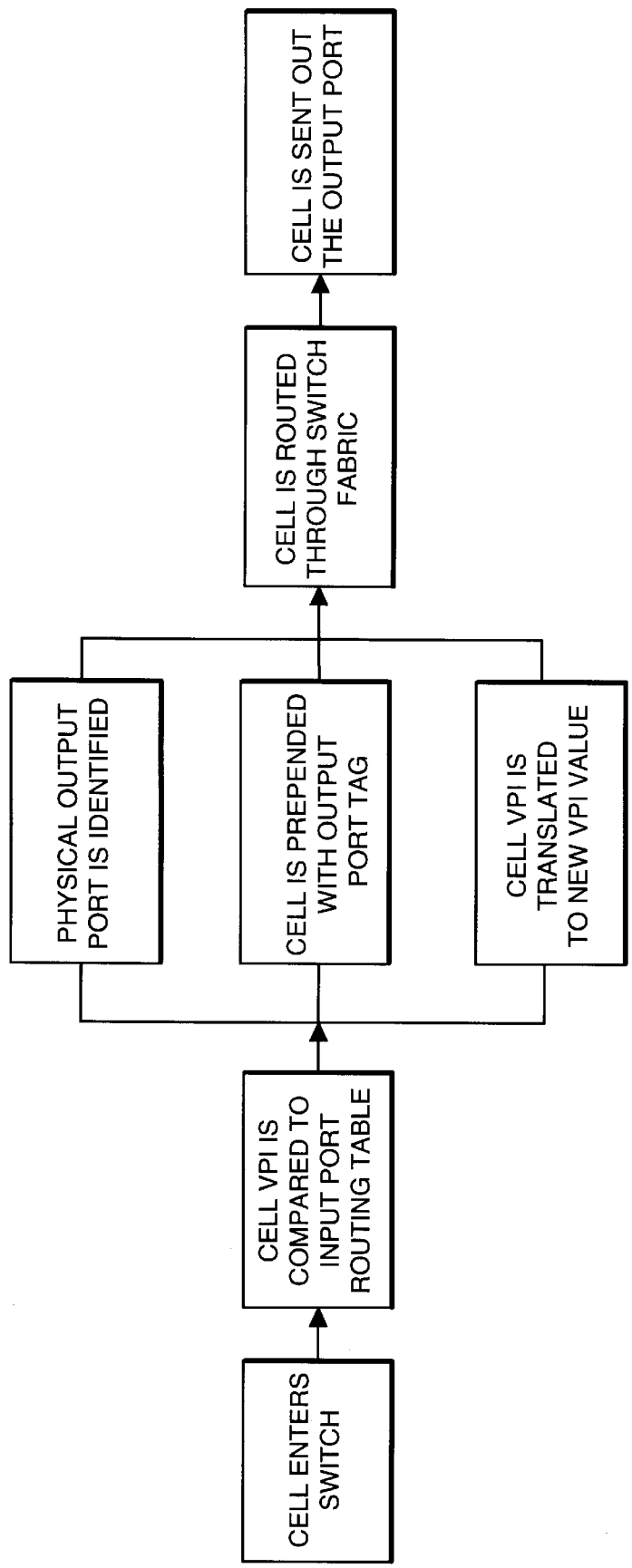
FIG. 3 is a conceptual block diagram of VPI routing as used in the FSN.

In the FSN, VPI switching is used exclusively in both the forward and reverse directions. Although the ATM switch is capable of supporting VCI switching, the FSN does not require VCI switching. FIG. 3 is a conceptual block diagram of VPI routing as used in the FSN. First, a cell, destined for a given, receiving set-top processor, enters switch 52. The VPI in the cell is compared to an input port routing table. From this comparison, a physical output port of switch 52 is identified. The output port number acts as a designator for each modulator. Further, this identification is essentially a mapping of the ultimate destination of the cell (i.e. to the receiving set-top processor) to the exact modulator that is assigned to the neighborhood which services the receiving set-top processor. As will be discussed below, this mapping may persist for the time that the server is render service to the receiving set-top processor.

Figure 4:
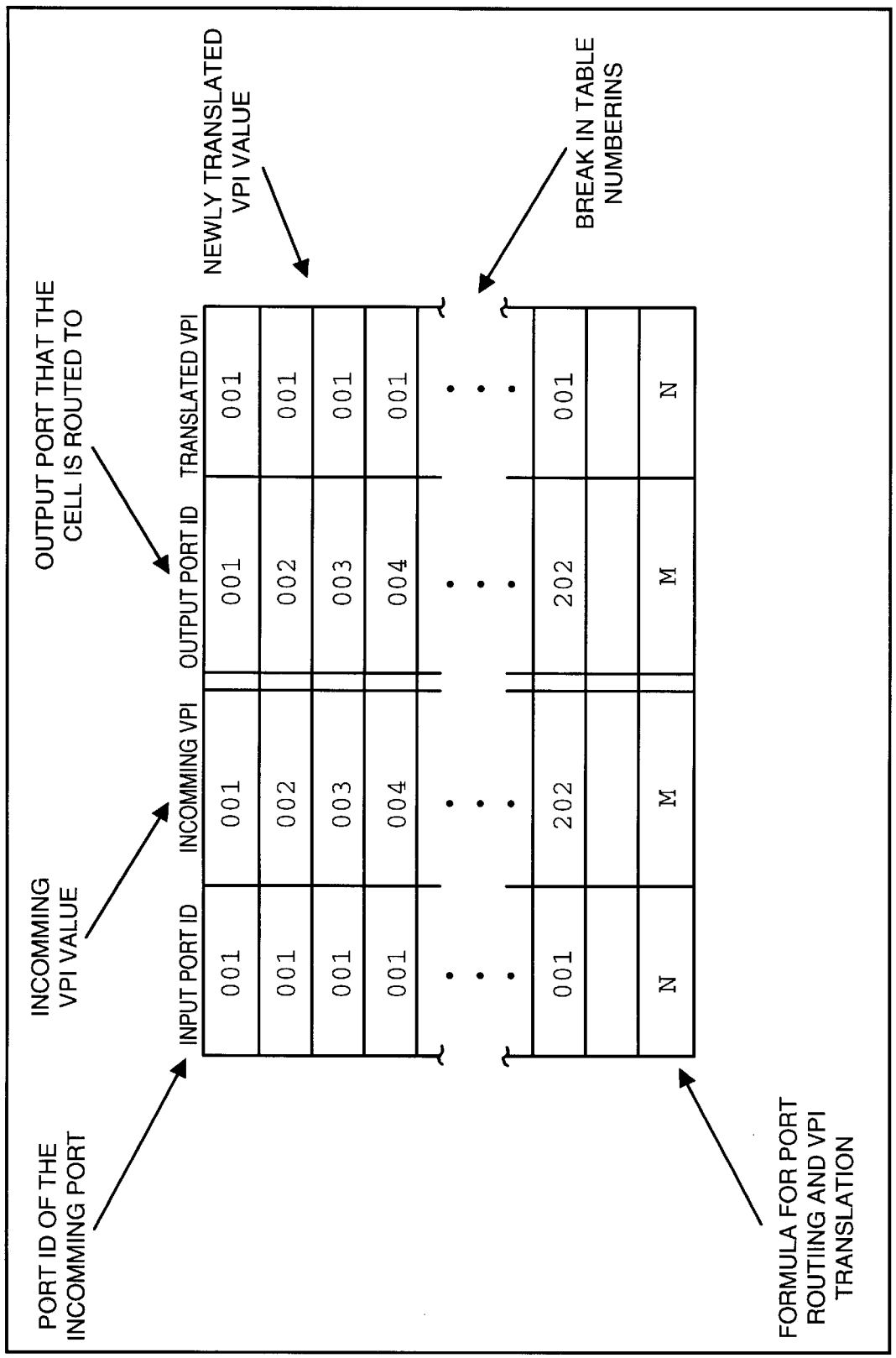
FIG. 4 is a diagram depicting a routing table as used by the network switch in the FSN.

The cell is then prepended with an output port tag and the cell VPI is translated to a new VPI value, whose importance will be described below. With a new VPI value, the cell is then routed through the switch and sent out through the given output port. Ultimately, the cell will be sent to the modulator assigned to neighborhood where the receiving set-top processor is resident. FIG. 4 is a diagram depicting the routing table described above. The table depicted contains four fields: an Input Port ID, an Incoming VPI, an Output Port ID and a Translated VPI. As an example, if a cell enters the switch from a server on Input port 001 with VPI 004, then the Output port is 004 and the VPI is changed to 001. This translated VPI identifies to the receiving set-top processor that the port, that the server currently providing service, is located on input port 001. This is important for continued bi-directional communications between server that is and receiving set-top processor throughout the duration of a session. VCI values are always passed transparently through the switch, as their function occurs at a later stage in the addressing of the cell to the receiving set-top processor.

Figure 5A:
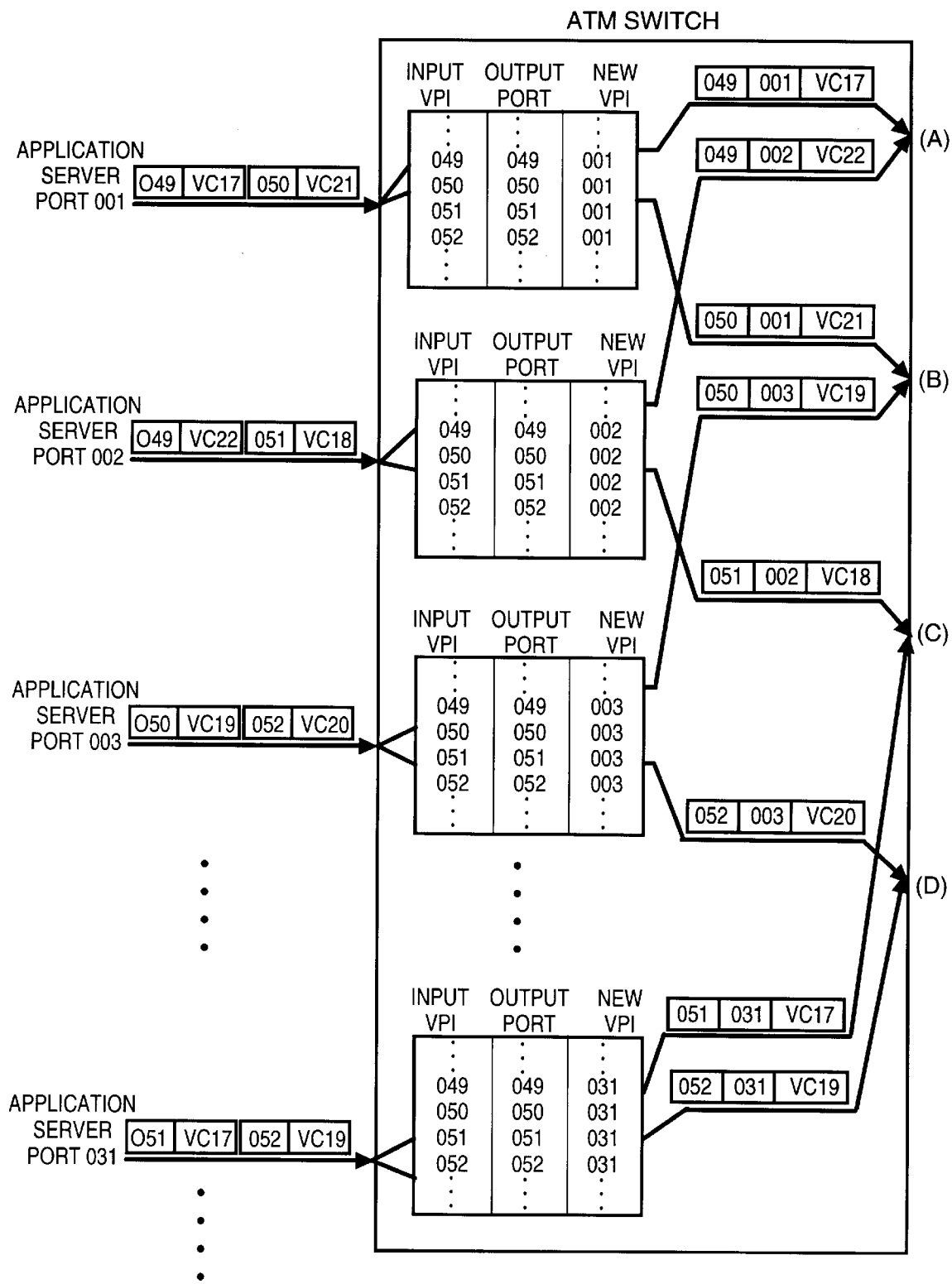
FIG. 5 is an example of data addressing in the forward direction in the FSN.
Figure 5B:
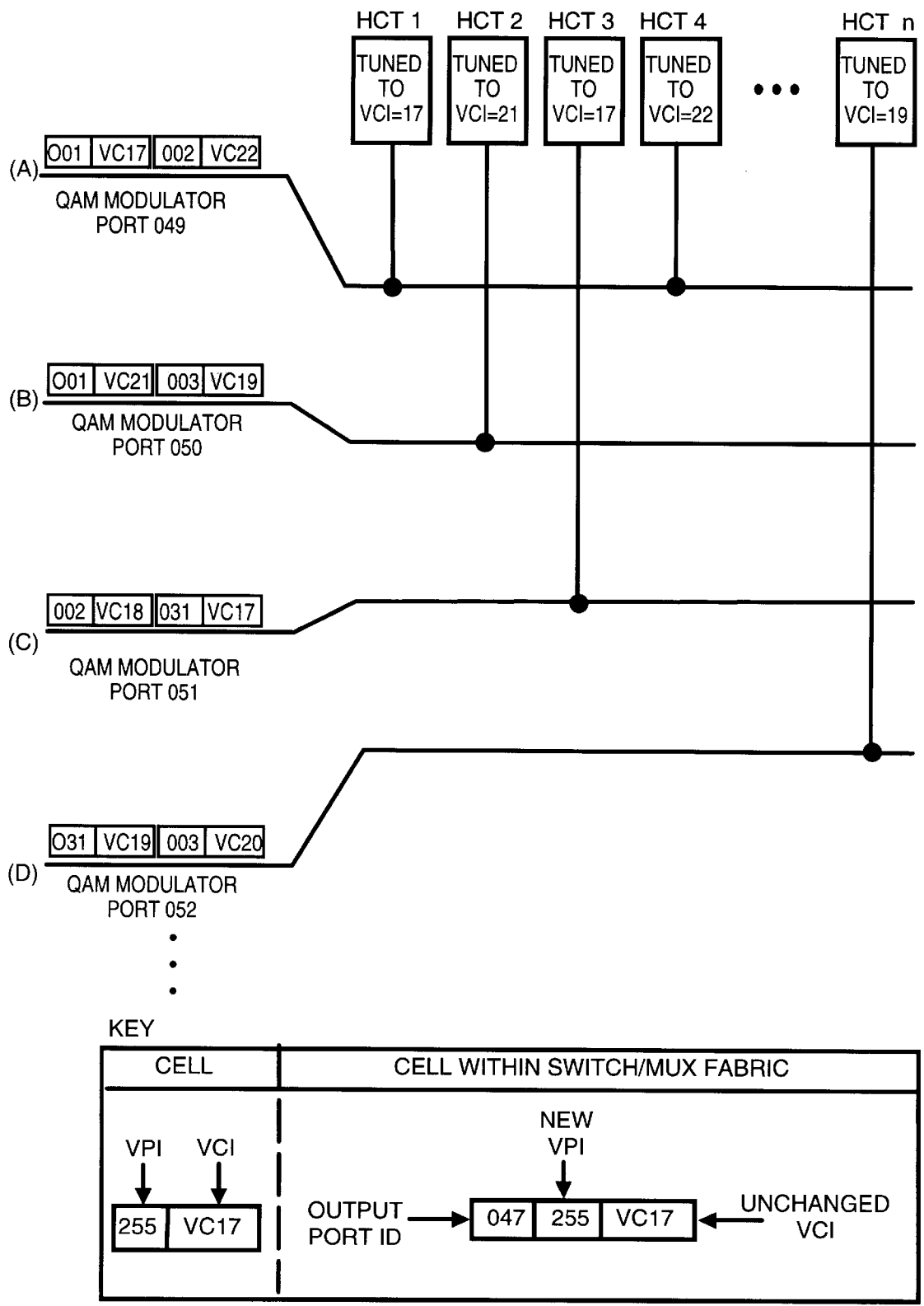

FIG. 5 provides an example of how forward data addressing occurs in the FSN. As shown in FIG. 5, four application servers (on input ports 001, 002, 003, and 031) are actively sending cells into the ATM switch. At the same time, cells are being transmitted from the switch by QAM modulators (on output ports 049, 050, 051, and 052) out to their assigned neighborhoods and to the subsets of set-top processors that comprise the neighborhoods. For example, the neighborhood connected to the QAM modulator on port 049 comprises set-top processors: HCT 1 and HCT 4. HCT 1 is currently tuned to VCI channel 17, while HCT 4 is tuned to VCI channel 22. These set-top processors are tuned to these particular channels to receive services from the servers. The period of time for such service defines a session. Once a given session is complete, the set-top processors need not monitor that particular channel.

As depicted, cells entering at the input port of the switch (e.g. the cell with header [049,VC-17] at server port 001) associates an output port number (e.g. port 049) with a virtual channel. As discussed below, a virtual channel number (e.g. VC-17) designates a receiving set-top processor connected to the modulator at output port (e.g. HCT 1 connected to modulator at port 049). Once at the output port, the VPI has been translated to associate a server at the given input port number with a virtual channel number. For example, the cells currently on output port 049 (namely, [001,VC-17] and [002,VC-22]) originated from input port 001 destined for HCT 1 and input port 002 destined for HCT 4, respectively. Thus, the server on input port 001 is currently engaged in a service session with HCT 1, while the server on input port 002 is engaged in a service session with HCT 4.

Figure 6:
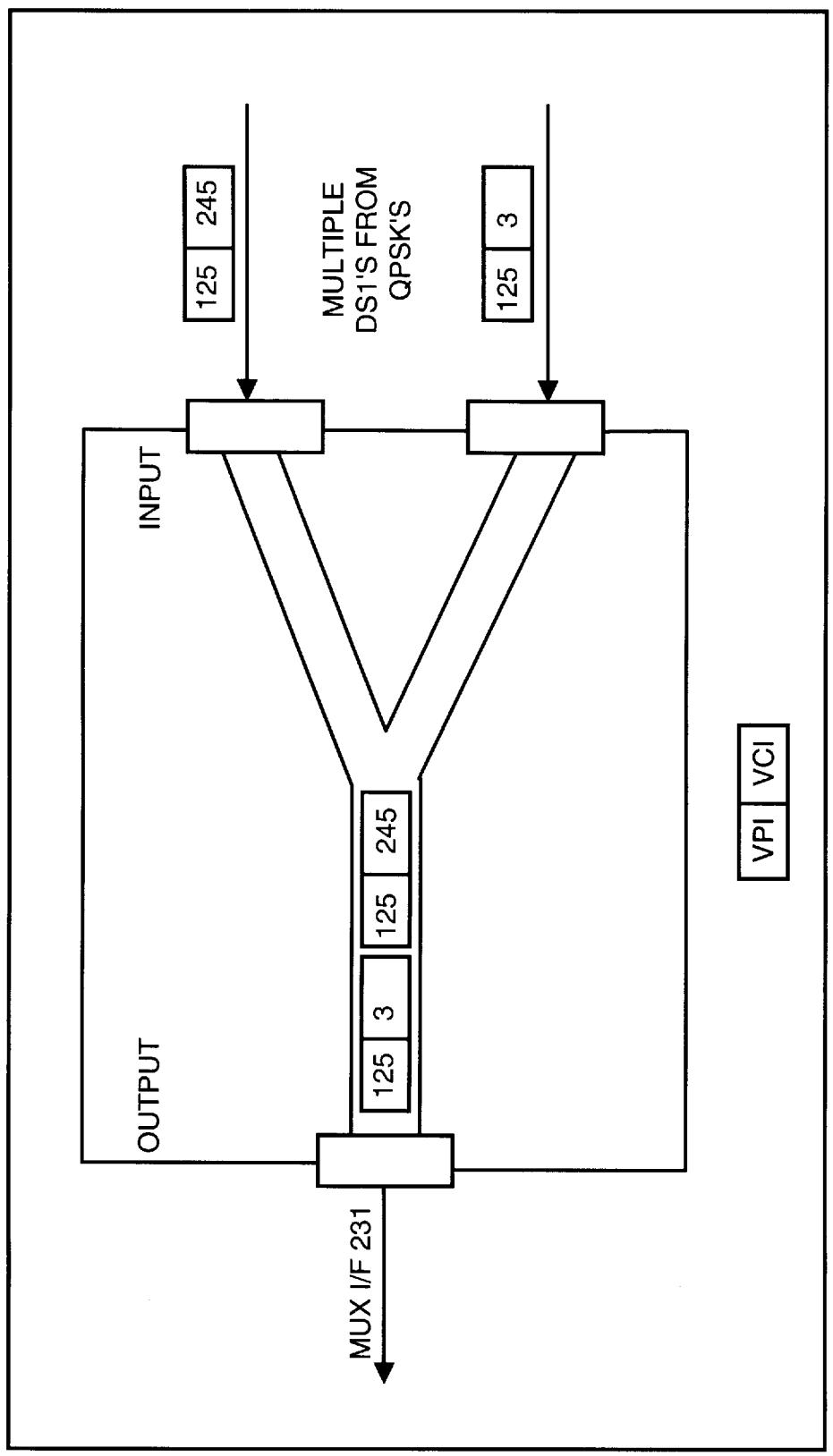
FIG. 6 is an example of VPI merging accomplished by the network multiplexor.
Figure 7A:
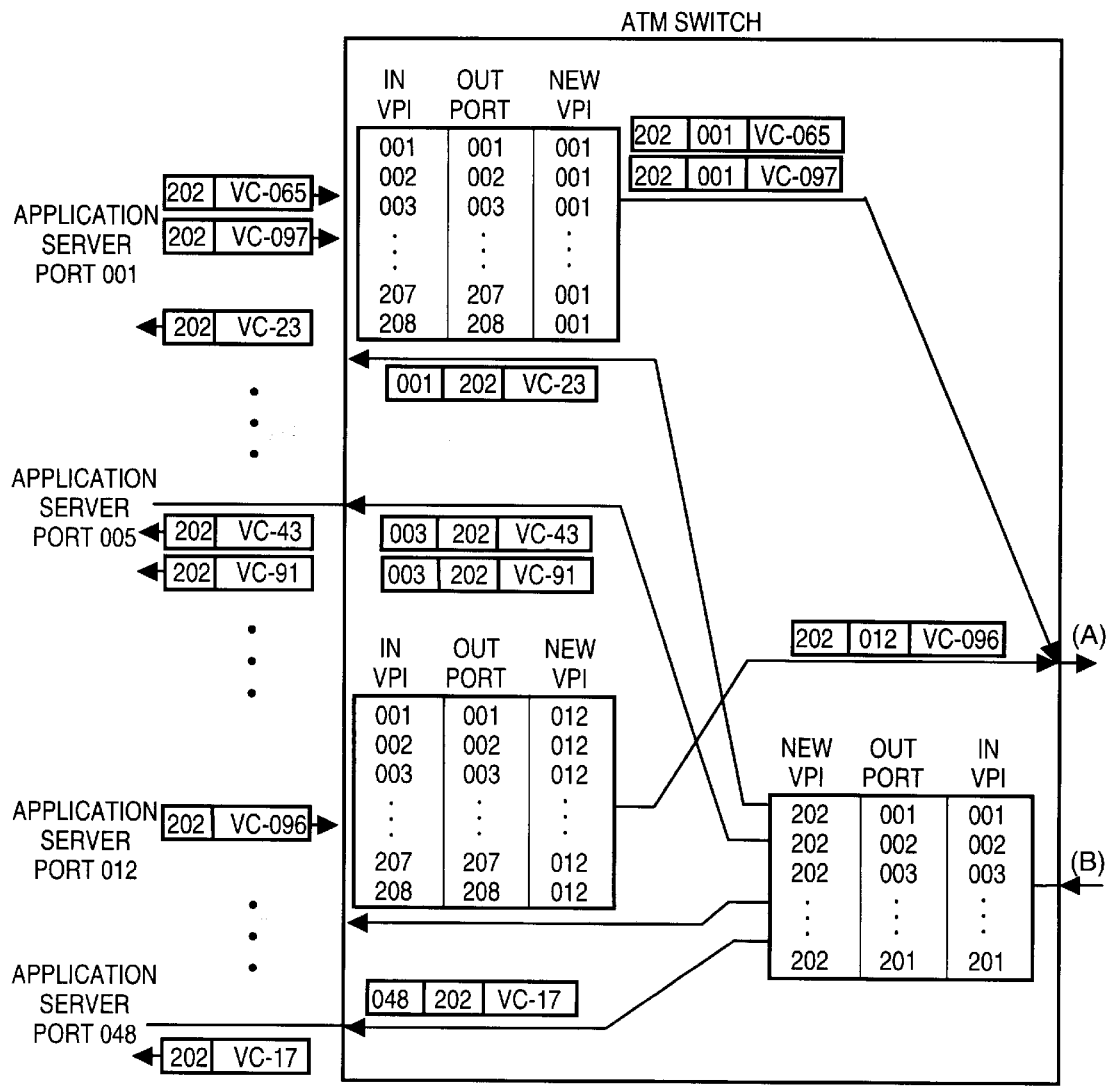
FIG. 7 depicts an example of addressing in both the forward and reverse directions in the FSN.
Figure 7A:
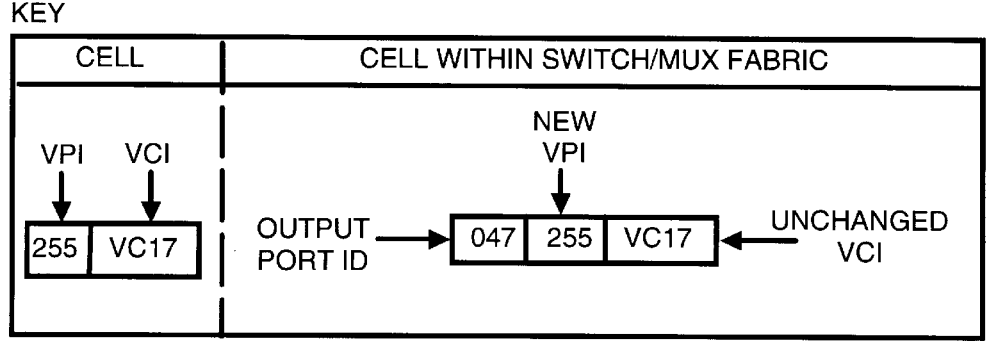
Figure 7B:
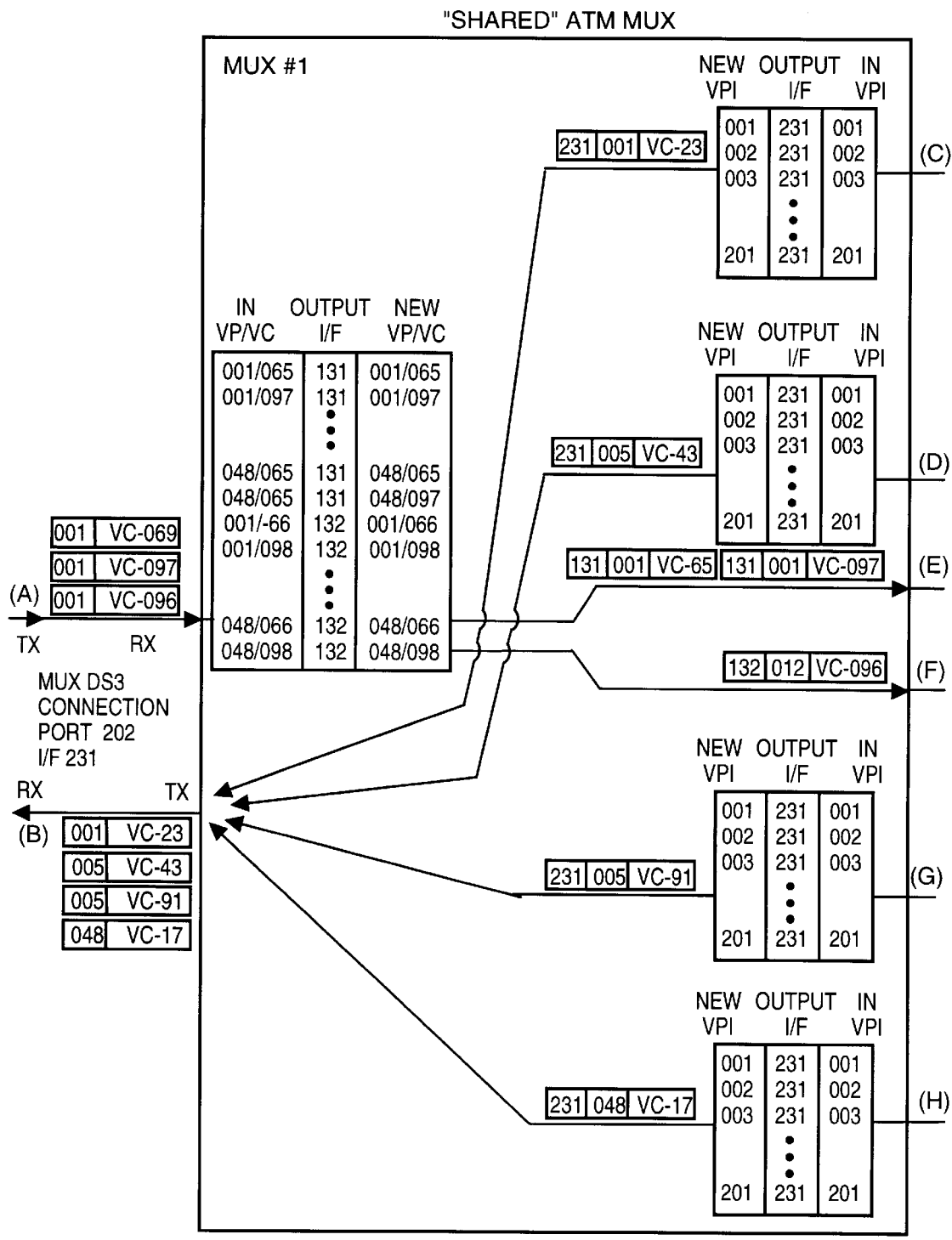
Figure 7C:
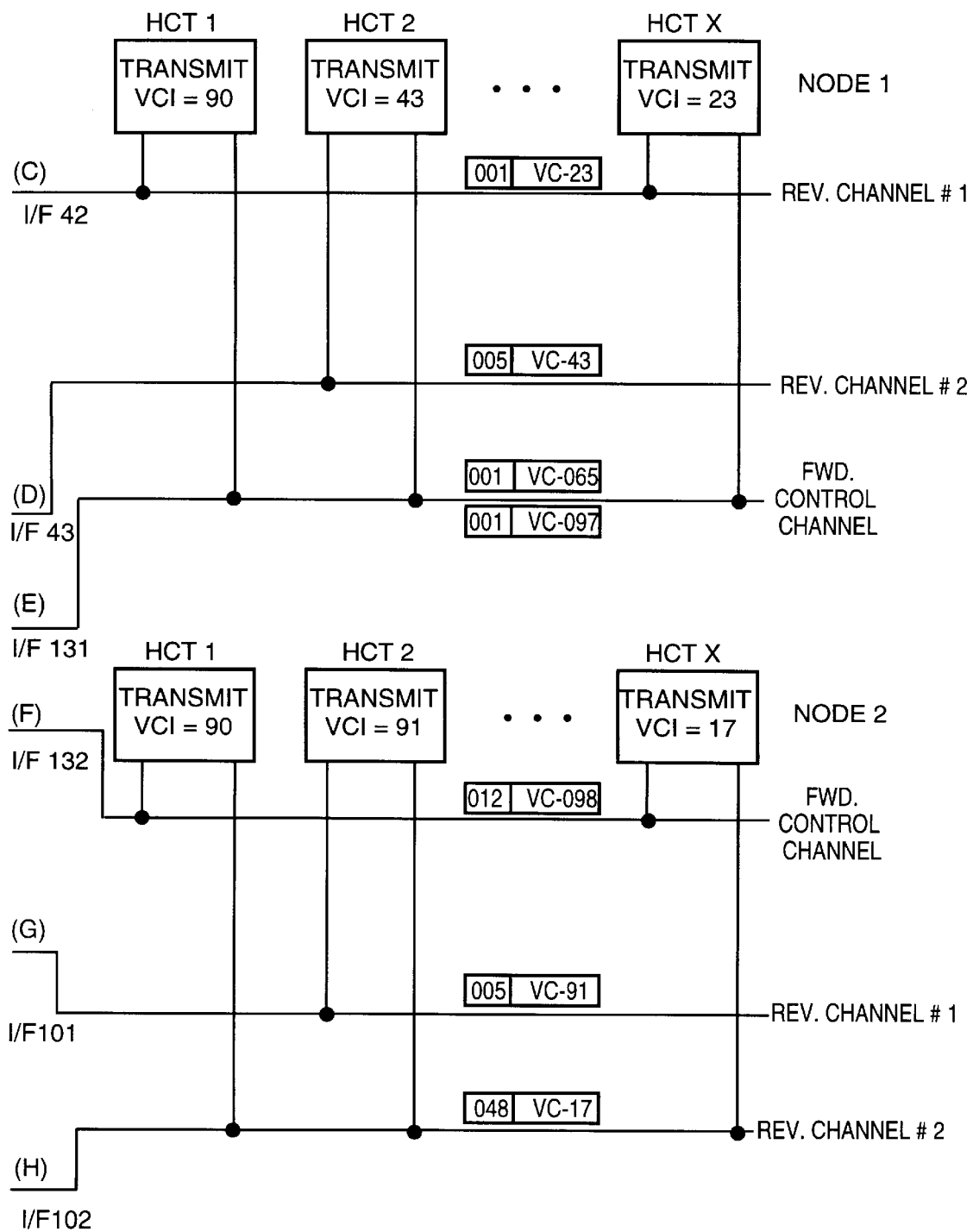

Apart from forward data, forward control data and reverse data are also routed through the FSN. To accomplish this, the ATM multiplexor 54 performs VPI "merging" on the data received from the QPSK demodulators 60. VPI merging is defined as the routing of cells with the same VPI value from distinct physical input ports to the same physical output port. In the reverse direction, DS1 traffic is routed, or merged, to the single DS3 path connecting each multiplexor to the ATM switch. FIG. 6 gives one example of VPI merging. All data entering the multiplexor from the DS1 ports is recognized to be in the reverse direction. Reverse data contains a VPI which indicates the ATM switch port destination. Therefore, within the multiplexor, cells are switched from the DS1 to the DS3 without performing any translation. All VPIs are merged within the multiplexor such that multiple DS1s will be able to send data with the same VPI to the same output port number. Data entering the multiplexor from the ATM switch DS3 is recognized to be in the forward direction. This data is referred to as the forward control data and the FSN design dedicated a unique forward control channel (FCC) to each neighborhood.

Now that both forward and reverse data addressing has been discussed, FIG. 7 gives an example of both types of addressing in the FSN. The multiplexor performs VP/VC switching on all forward data.. As a cell enters the multiplexor, its VPI and VCI values are read. The cell is then routed to the proper output port based upon a provisioning table internal to the multiplexor. The VPI values of data entering the multiplexor correspond to the port number of the server which sent the data. The VCI values of the data entering the multiplexor correspond to the forward control channels for which the data is destined, plus an offset to identify the required virtual channel. Two specific virtual channels contain boot parameters for each neighborhood, which are transmitted from the servers via the forward control channels. One virtual channel is the actual boot broadcast, whose VCI is determined by adding 64 to the destination node number. The other boot parameter is the time-of-day broadcast, whose VCI is found by adding 96 to the destination node number.

As an example for communications on the forward control channel, the server for port 001 transmits two cells, one time broadcast and one boot broadcast, bound for the Node #1 forward control channel. These cells have values VPI= 202, VCI=VC-65 and VPI=202, VCI=VC-97, respectively. As indicated, the Node #1 forward control channel is connected to ATM multiplexor #1. Therefore, all server ports will address cells destined for the Node #1 forward control channel with VPI equal to 202. The switch input port translates this VPI value into the value of the input port, VPI=001. In the switch, the VCI value is not altered. At the ATM multiplexor, both the VPI and VCI values will be used to route the cell to the proper DS1 port interface #131.

A time broadcast cell is sent from server port 012 to the time broadcast virtual channel on the Node #2 forward control channel. This cell has a value of VPI=202 and VCI=VC-98. The switch ports are provisioned to map VPIs equal to 202 to DS3 port 202 connecting the switch to the ATM multiplexor #1. In this example, the switch input port translates this VPI value to the value of the input port, VPI=012. In the switch, the VCI value is not altered. At the multiplexor, both the VPI and VCI values will be used to route the cell to the proper DS1 port #132.

In the reverse direction, a cell with VPI=001, VCI=VC-23 is sent from HCT 1 in node 1 destined for server port 001. In this example, the cell enters multiplexor #1; the multiplexor translates this VPI value into the same value of VPI=001; and the cell is routed to the multiplexor port 231. The cell is multiplexed with other reverse cells and passed to the corresponding DS3 port on the switch. Once in the switch, the VPI is used to route the cell to port 001. As mentioned previously, VPI merging is required in the ATM multiplexor in order to accommodate the fact that some of the cells destined from the multiplexor DS1 ports to the DS3 port have the same VPI value.

There has thus been shown and described a novel system and method for addressing messages and packets in a network which meets the objects and advantages sought. As stated above, many changes, modifications, variations and other uses and applications of the subject invention will, however, become apparent to those skilled in the art after considering this specification and accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. In a network designed to provide interactive services, said network comprising a head end; a plurality of modulators, said modulators being individually addressable by the head end via a network switch; and a plurality of set-top processors connected to said plurality of modulators, said plurality of set-top processors being partitioned into subsets of set-top processors, each said processor subset being assigned to at least one modulator that is responsible for sending and receiving data and instruction packets to all set-top processors in a processor subset; a method for addressing a given packet to be sent from said head end to a receiving set-top processor, comprising the steps of:

(A) assigning a unique designator to each individual one of the plurality of modulators;

(B) maintaining at the network switch an association-correlation for each individual set-top processor and each individual modulator, the association-correlation operating to correlate each individual set-top processor with a modulator that is assigned to a processor subset of which an individual set-top processor is a member;

(C) for the given packet that is to be sent to a receiving set-top processor, including the designator of the receiving set-top processor's assigned modulator in the given packet;

(D) using the association-correlation to route the given packet through the network switch to the receiving set-top processor's assigned modulator;

(E) multicasting the given packet from the receiving set-top processor's assigned modulator to a processor subset of which the receiving set-top processor is a member;

(F) routing the given packet to the receiving set-top processor; and (G) recognizing the given packet at the receiving set-top processor as a packet that is addressed to the receiving set-top processor.

2. The method as recited in claim 1 wherein the step of including the assigned modulator designator in the given packet includes the step of placing the designator into a VPI field of an ATM packet.

3. The method as recited in claim 1 further comprising the steps of:

(H) placing a set-top processor designator into the given packet;

(I) informing the receiving set-top processor of the set-top processor designator that is in the given packet; and (J) recognizing the set-top processor designator in the given packet at the receiving set-top processor.

4. The method as recited in claim 3 further comprising the steps of:

(K) assigning a session designator for a session requested by the receiving set-top processor; and (L) placing the session designator into the given packet.

5. The method as recited in claims 3 or 4 wherein the set-top processor designator is a virtual channel number placed in a VCI field of an ATM packet.

6. The method as recited in claim 4 wherein the step of informing the receiving set-top processor of the set-top processor designator that is in the given packet further comprises transmitting the set-top processor designator that is in the given packet to the receiving set-top processor on a channel that is dedicated to the receiving set-top processor.

7. In a full service network having; a headend that includes a plurality of application servers; an ATM-switch that includes a plurality of input ports, each input port having an input-port-identifier and each input port connected to at least one of said application servers, said ATM-switch including a plurality of output ports, each output port having an output-port-identifier and each output port connected to one of a plurality of modulators; a plurality of users partitioned into a number of user-subsets, each user-subset having a shared-communication-medium that is connected to be serviced by at least one of said modulators; an addressing method for an ATM-cell that is to be sent from said headend to a given-user, said ATM-cell containing a data-field, a virtual-path-identifier-field, and a virtual-channel-identifier-field; said method comprising the steps of:

providing a routing-table within said ATM switch;

said routing-table correlating an input-port-identifier and a virtual-path-identifier-field to an output-port-identifier and a translated-virtual-path-identifier-field;

said output-port-identifier-field operating as a designator for a modulator and a shared-communication-medium to which said ATM-cell is to be sent by said ATM-switch;

such that said ATM-cell is outputted by said ATM-switch as an output-ATM-cell on an output-port as determined by said routing-table, and with a translated-virtual-path-identifier field as determined by said routing-table;

said output-ATM-cell having an unchanged virtual-channel-identifier field and an unchanged data-field;

sending said output-ATM-cell to a shared communications medium that is connected to said output-port;

recognizing at said given-user said virtual-channel-identifier that is within said output-ATM-cell; and receiving the data-field that is within said output-ATM-cell at said given-user.

8. The method of claim 7 wherein said modulators are QAM modulators.

* * * * *